FIG. 1
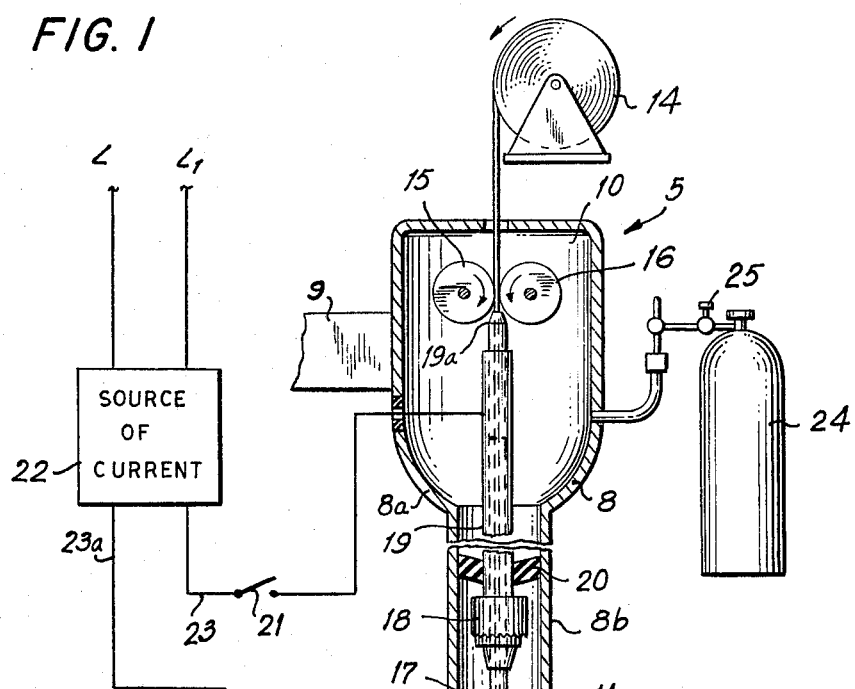
FIG. 2
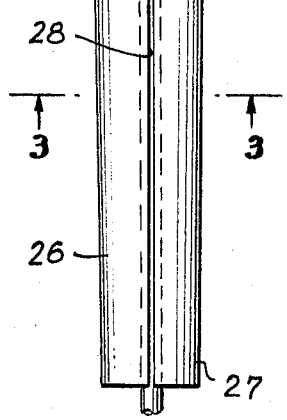
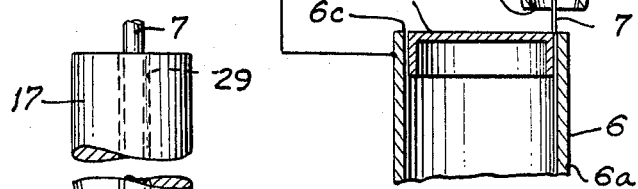
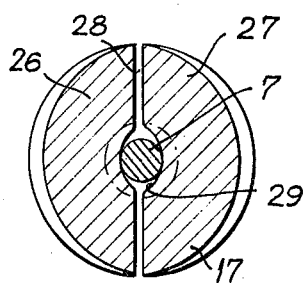
FIG. 3
INVENTORS
PAUL R. FIEDLER
WILBUR C. OSHA
LEONARD BAUM, Jr.
BY Curtis, Morris & Safford
ATTORNEYS

United States Patent Office 3,290,480
Patented Dec. 6, 1966

3,290,480
ARC WELDING
Paul R. Fiedler, Andover, Wilbur C. Osha, Morristown, and Leonard Baum, Jr., Oakland, N.J., assignors to Thiokol Chemical Corporation, Bristol, Pa., a corporation of Delaware
Filed Dec. 7, 1965, Ser. No. 512,059
1 Claim. (Cl. 219—136)

The present invention relates to welding and more particularly to supplying electric current to an electrode wire of welding material in an arc welding machine.

In conventional arc welding machines a wire of the welding material is fed from a spool through a contacting element as it moves toward the work-piece. An arc is produced between the end of the wire and work-piece which melts the wire and deposits the molten material at a desired location on the work-piece. In many types of arc welding, an envelope of inert gas is delivered around the arc and melting wire to prevent oxidation. Thus, the moving wire of welding material constitutes an electrode to which electric current is supplied.

The contacting element usually comprises a metal sleeve of an electric conductive material, such as copper or the like, through which the wire of welding material passes and has an axial opening only slightly larger than the wire. Such a sleeve is desirable as it tends to straighten the wire as it passes therethrough, prevents kinks from forming in the wire and controls and guides the wire as it moves at a relatively fast rate toward the work-piece. However, the supply of electric current to the moving wire in such a construction is haphazard and poses a problem. If the inside diameter of the contacting sleeve is made too small, it offers too great a resistance to the free movement of the wire therethrough and the wire tends to jam in the sleeve. If the inside diameter of the contacting sleeve is made too large, or becomes enlarged due to wear, the points or lines of contact between the sleeve and wire are reduced. In either case, the points or lines of contact through which electric current flows from the sleeve to the wire is continuously changing due to variations in the surface of the wire as its position in the sleeve and curvature vary as it unwinds from a spool. As a result, a series of arcs are apt to occur between the inner wall of the sleeve and the wire which either impairs or ultimately stops the feeding of the wire through the contacting element.

Such arcs between the wire and contacting sleeve may result in an actual welding of the wire to the sleeve, or a deposit of small quantities of the welding material on the interior of the sleeve which increases the resistance to movement of the wire through the sleeve. If the wire material does not feed at the required rate for a particular current flow the arc between the end of the wire and work-piece will "burn back" the wire to the end of the sleeve and weld the wire thereto. When this happens the machine must be stopped, the contact sleeve and wire welded thereto removed from the machine, a new length of wire must be threaded through a new contact sleeve and the new contact sleeve must be mounted on the machine. Such "burn backs" necessarily increase the down time of the welding apparatus as well as constituting a nuisance in the time and labor required to repair the breakdown and may result in the deposition of contact tube material in the molten weld puddle making rework necessary. Such a plurality of arcs also varies the arc produced between the wire and work which may result in porous welds.

Contact elements of different constructions have heretofore been proposed, but each has some disadvantage which renders it impractical to use. For example, one construction provides a tip at the end of a sleeve having separate sections, one of which is spring pressed toward the other. It has been found, however, that when a tip of this construction is used with round wire that the inner edge of the movable section acts as a cutting surface and shaves off particles from the wire and, in a relatively short period of time, binds the wire to the tip.

One of the objects of the present invention is to provide an improved contact element for use in an arc welding machine of the type indicated which materially reduces "burn backs" and the necessity of replacing the element.

Another object is to provide an improved contact sleeve in an arc welding machine which produces a more reliable contact between it and the wire electrode of welding material at a fixed location to maintain a more constant voltage drop between the wire and work and thereby avoid porous welds.

Still another object is to provide a contact sleeve for use in an arc welding apparatus which is of simple and compact construction, economical to manufacture and one which is more reliable in operation in performing its intended function.

These and other objects will become more apparent from the following description and drawing in which like reference characters denote like parts through the several views. It is to be expressly understood, however, that the drawing is for the purpose of illustration only and is not a definition of the limits of the invention, reference being had for this purpose to the appended claims.

In the drawings:
FIGURE 1 is a schematic view of an arc welding apparatus incorporating the novel features of the present invention and showing the construction and location of the contact sleeve;
FIGURE 2 is a longitudinal view of the contact sleeve and showing the slot at one end forming spaced fingers for laterally engaging the sides of the wire of welding material; and
FIGURE 3 is transverse sectional view taken on line 3—3 of FIGURE 2 to show the lines of contact between the spring fingers and opposite sides of the wire welding material.

Referring now to the drawing, an arc welding apparatus is illustrated comprising a welding head 5 mounted above a work-piece 6. An electrode wire 7 of the welding material depends from the head 5 in spaced relation to a work-piece 6 to produce an arc therebetween. The work-piece 6 may be of any shape or size and in the illustrated embodiment is shown in the form of a cylindrical tube 6a and closure plate 6b to be attached to its end and forming a circular seam 6c therebetween. The head 5 is preset a predetermined distance above the seam 6c to be welded and an arc is struck between the work-piece 6 and wire 7 which melts the wire and deposits it in the seam 6c. Simultaneously with the striking of the arc the welding wire is fed at a rate to deposit the amount of metal required to form the weld. Wire 7 may be composed of a material used for welding the material of the work-piece, such as ferrous and non-ferrous materials.

The welding head 5 may move with respect to the workpiece 6 in the path of the seam, or the work-piece may move with respect to the head. As shown, the head comprises a casing 8 mounted on an arm 9 for movement as a unit in a path corresponding to the seam 6c to be welded. Casing 8 has a cylindrical section 8a forming an upper chamber 10 and a depending cylindrical section 8b of smaller diameter forming a lower chamber 11. The lower end 12 of section 8 is of conical shape and forms an outlet opening 13 above the work-piece 6. Wire 7 of the welding material is wound on a spool 14 with its end extending through the upper and lower sections 8a and 8b of the casing. Feed rollers 15 and 16 engage the opposite sides of the wire 7 in the upper chamber 10 of the casing to feed it from the spool 14 and through the casing. Below the feed rollers 15 and 16 is a contact sleeve 17 through which the wire extends. Contact sleeve 17 is in the form of a short section of tube and is detachably mounted in the head 5 by means of a collet 18 at the lower end of a metal tube 19 supported axially in the casing 8 by arms 20 of an electric insulating material. A short section 19a of tubing is usually provided in the upper end of tube 19 above the sleeve 17 and has a conical end adjacent the feed rolls 15 and 16.

Wire 7 is connected to a source of low voltage electric current 22 by a conductor 23 insulated from casing 8 and connected to the metal tube 19 which, in turn, is connected to the contact sleeve 17 through the collet 18. The engagement of wire 7 with the contact sleeve 17 as it passes therethrough energizes the wire. The source of current 22 is the secondary of a stepdown transformer having power lines L and L–1 connected to the primary winding. The end of the secondary winding opposite the one connected to the conductor 23 is connected to the workpiece 6 by a conductor 23a to complete an electric circuit. Current flow from the source of current 22 is controlled by a switch 21 in the conductor 23.

An inert gas, such as helium or argon, is supplied to the interior of the casing 8 at a controlled rate from a container 24. To this end, the container 24 is connected to the chamber 10 of the casing 8 by suitable conduits including a control valve 25. The inert gas flows from upper chamber 10 of the casing 8 into the lower chamber 11 and escapes from the outlet opening 13 in an annular column around the welding wire 7. Thus, the gas forms an enclosing envelope around the lower end of the welding wire 7 and arc formed between it and the work-piece 6 to prevent oxidation of the molten welding material or the entry of contaminants such as dust into the puddle of molten metal.

In accordance with the present invention the contact sleeve 17 has spaced fingers 26 and 27 at its lower end in a one-piece integral structure and the fingers are sprung inwardly to resiliently engage the sides of the welding wire 7 as shown in detail in FIGURES 2 and 3. The spring fingers 26 and 27 are formed by cutting a diametric slot 28 in the lower end portion of the sleeve 17. It has been found that the slot 28 may be aligned with the hole 29 or offset with respect to the hole so long as it is located between the sides of the hole. The slot 28 may have a width less than the diameter of the axial hole 29 in the sleeve 17, and in the illustrated embodiment the slot has a width about one-half the diameter of the hole to provide a substantial overlap between the fingers 26 and 27 and periphery of the wire. The spring fingers 26 and 27 are then sprung inwardly by pressing them toward each other. When so formed the spring fingers 26 and 27 resiliently engage the sides of the wire 7 as shown in FIGURE 3 and provide two lines of contact to prevent arcing between the wire and the contact member at other locations than the fingers. Furthermore, this slotted sleeve construction eliminates any cutting surfaces in the direction of movement of the wire 7 which might tend to cut material from the wire and either increase its resistance to movement or build up chips of the wire material on the interior of the contact tube which would increase the resistance to movement of the wire through the tube. It has been found that a contact sleeve of this construction materially reduces "burn back" and replacement of contact sleeves as well as reducing the down time of the welding equipment and labor and cost of replacing tubes.

In a particular installation in which the contact sleeve of the present invention is being used successfully to weld aluminum parts, a welding wire of aluminum has a diameter of 0.0468 inch for welding a seam between a tube 6a and flanged plate 6b as shown in FIGURE 1 of the drawing. The contact sleeve of a copper alloy has an axial hole of 0.0710 inch in diameter through which the welding wire feeds to provide a clearance of 0.0242 inch. The contact sleeve 17 is 9.00 inches long and the slotted portion is 2.00 inches in length with the slot 0.0350 inch wide in alignment with the hole therein. Thus, the spring fingers have arcuate grooves 0.0180 inch deep. One form of the invention having now been described, the manner of setting up the apparatus and mode of operation is next explained.

Switch 21 in conductor 23 is shown open to deenergize the apparatus and the end of the wire 7 of welding material is threaded through the feed rollers 15 and 16, tube 19a, collet 18 and then through a contact sleeve 17 externally of the casing. Sleeve 17 with the wire 7 extending therethrough is then inserted into the collet 18 to position its lower end a required distance above the outlet 13 at the lower end of the depending casing section 8b. The collet 18 is then closed to lock the contact sleeve 17 in position in the casing 8. Valve 25 is opened to supply inert gas from the container 24 to the chamber 10 in the casing which flows downwardly and displaces air in the depending section 8b of the casing and then outwardly through the opening 13 around the lower end of the wire 7.

The apparatus is then ready for a welding operation and switch 21 is closed to supply low voltage electric current from the source 22 through the conductor 23, metal tube 19, collet 18 and contact tube 17 to the wire 7. Simultaneously the feed rollers 15 and 16 are actuated to feed the lower end of the wire into engagement with the work-piece 6. When the end of the wire 7 engages the work-piece 6 to complete a circuit, current flows through the wire and melts the end. As the end of the wire melts it produces an electric arc which increases in length until an equilibrium condition exists where the lower end of the wire continues to melt at the rate it is being fed by rollers 15 and 16. The molten welding material is deposited in the seam 6c as the head 5 is moved in a path along the seam or the work-piece is moved relative to the head. During a welding operation the speed of movement of the head 8 relative to the work-piece 6, the rate at which the wire 7 of the welding material is fed into the work-piece 6 and the current flow are all coordinated in a known manner to produce a weld. During such welding the inert gas escapes throughout the outlet opening 13 in the head to suround the arc and lower end of the anode 7 to prevent oxidation and contamination.

The feeding of the wire 7 by feed rollers 15 and 16 tends to straighten the wire which together with the movement through tube 19a and contact tube 17 further straightens the wire. As the wire 7 passes through the contact sleeve 17 the sides of the wire are yieldingly engaged by the grooved fingers 26 and 27 at the lower end of the sleeve to insure adequate contact for the current flow to prevent arcing at other locations along the interior of the sleeve. As a result, no material is either cut from the wire 7 during its passage through the contact sleeve, nor is any of the material of the wire deposited on the interior of the contact tube due to uncontrolled arcing therein. As a result, the resistance to the movement of the wire 7 remains substantially constant during a welding operation which avoids "burn backs," stoppage of the movement of the anode wire and replacement of sleeves.

It will now be observed that the present invention provides an improved contact element for use in an arc welding machine which materially reduces "burn backs" and the necessity of replacing such contact elements. It will further be observed that the present invention provides an improved contact sleeve which produces a more reliable contact between it and the welding wire at a fixed location than prior constructions. It will further be observed that the present invention provides a contact sleeve for an arc welding apparatus which is of simple and compact construction, economical to manufacture and one which is reliable in operation in performing its intended function.

While a single embodiment of the invention is herein illustrated and described, it will be understood that further changes may be made in the construction and arrangement of elements without departing from the spirit or scope of the invention. Therefore, without limitation in this respect, the invention is defined by the following claim.

We claim:

An electric arc welding apparatus comprising a wire of welding material constituting an electrode, means for feeding said wire toward a workpiece, a contact sleeve of electric conductive material through which said wire of welding material extends, a source of electric current connected to the contact sleeve, said contact sleeve being of a one-piece construction having a uniform wall thickness throughout its length and a continuous and uniform bore of slightly greater diameter than the diameter of the electrode wire, said sleeve having a slot at its outer end to provide spaced fingers between which the wire feeds toward the workpiece, and said spaced fingers being sprung inwardly to resiliently contact the electrode wire throughout a substantial portion of the slotted outer end of the sleeve.

References Cited by the Examiner

UNITED STATES PATENTS

| | | | |
|---|---|---|---|
| 2,829,240 | 4/1958 | Ballington | 219—136 |
| 2,909,645 | 10/1959 | Berg | 219—130 |

RICHARD M. WOOD, *Primary Examiner.*